US008740552B2

(12) United States Patent
Marusko et al.

(10) Patent No.: US 8,740,552 B2
(45) Date of Patent: Jun. 3, 2014

(54) LOW-DUCTILITY TURBINE SHROUD AND MOUNTING APPARATUS

(75) Inventors: Mark Willard Marusko, Springboro, OH (US); Joseph Charles Albers, Fort Wright, KY (US); Aaron Michael Dziech, Cincinnati, OH (US); Christopher Ryan Johnson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 847 days.

(21) Appl. No.: 12/790,209

(22) Filed: May 28, 2010

(65) Prior Publication Data

US 2011/0293410 A1 Dec. 1, 2011

(51) Int. Cl.
*F01D 11/08* (2006.01)

(52) U.S. Cl.
USPC ........................................ 415/173.1

(58) Field of Classification Search
USPC ........................................ 415/173.2
See application file for complete search history.

(56) References Cited

U.S. PATENT DOCUMENTS

| 4,087,199 A * | 5/1978 | Hemsworth et al. ........ 415/173.3 |
| 4,398,866 A * | 8/1983 | Hartel et al. ................... 415/180 |
| 4,805,398 A | 2/1989 | Jourdain et al. |
| 5,228,828 A * | 7/1993 | Damlis et al. ............... 415/173.2 |
| 6,733,235 B2 * | 5/2004 | Alford et al. ................ 415/173.1 |
| 2003/0031557 A1 * | 2/2003 | Arilla et al. ................. 415/173.1 |
| 2008/0206046 A1 * | 8/2008 | Razzell et al. .............. 415/173.1 |
| 2010/0232941 A1 * | 9/2010 | Smoke et al. ............... 415/173.1 |

FOREIGN PATENT DOCUMENTS

| EP | 16430 4 A1 | 4/2006 |
| FR | 1230788 A | 9/1960 |
| GB | 733918 A | 7/1955 |
| GB | 1574981 A | 9/1980 |
| GB | 2397102 A | 7/2004 |

OTHER PUBLICATIONS

GB Search Report dated Sep. 15, 2011 issued in connection with Application No. GB1108856.4.

* cited by examiner

*Primary Examiner* — Nathaniel Wiehe
*Assistant Examiner* — Jeffrey A Brownson
(74) *Attorney, Agent, or Firm* — William Scott Andes; Trego, Hines & Ladenheim, PLLC

(57) ABSTRACT

A turbine shroud apparatus for a gas turbine engine includes an arcuate turbine shroud segment of low-ductility material and having a cross-sectional shape defined by opposed forward and aft walls, and opposed inner and outer walls, the walls extending between opposed first and second end faces. At least a portion of each of the forward and aft walls is oriented at an acute angle to the outer wall. Radially inner ends of the forward and aft walls are substantially closer together than radially outer ends thereof.

10 Claims, 5 Drawing Sheets

LOW-DUCTILITY TURBINE SHROUD AND MOUNTING APPARATUS

BACKGROUND OF THE INVENTION

This invention relates generally to gas turbine engines, and more particularly to apparatus for mounting shrouds made of a low-ductility material in the turbine sections of such engines.

A typical gas turbine engine includes one or more turbine rotors which extract energy from the primary gas flow. Each rotor comprises an annular array of blades or buckets carried by a rotating disk. The flowpath through the rotor is defined in part by a shroud, which is a stationary structure which circumscribes the tips of the blades or buckets. These components operate in an extremely high temperature environment, and must be cooled by air flow to ensure adequate service life. Typically, the air used for cooling is extracted (bled) from the compressor. Bleed air usage negatively impacts specific fuel consumption ("SFC") and should generally be minimized.

It has been proposed to replace metallic shroud structures with materials having better high-temperature capabilities, such as ceramic matrix composites (CMCs). These materials have unique mechanical properties that must be considered during design and application of an article such as a shroud segment. When compared with metallic materials, CMC materials have relatively low tensile ductility or low strain to failure, and a low coefficient of thermal expansion ("CTE").

BRIEF SUMMARY OF THE INVENTION

The present invention provides a turbine shroud having a generally trapezoidal cross-sectional shape which is mounted to a stationary structure using a wedging action.

According to one aspect of the invention, a turbine shroud apparatus for a gas turbine engine includes an arcuate turbine shroud segment of low-ductility material and having a cross-sectional shape defined by opposed forward and aft walls, and opposed inner and outer walls, the walls extending between opposed first and second end faces. At least a portion of each of the forward and aft walls is oriented at an acute angle to the outer wall, radially inner ends of the forward and aft walls are substantially closer together than radially outer ends thereof.

According to another aspect of the invention, a turbine shroud apparatus for a gas turbine engine includes: (a) a plurality of arcuate shroud segments arranged to form an annular shroud, each of the shroud segments embodying low-ductility material and having a cross-sectional shape defined by opposed forward and aft walls, and opposed inner and outer walls, the walls extending between opposed first and second end faces, wherein at least a portion of each of the forward and aft walls is oriented at an acute angle to the outer wall, and wherein radially inner ends of the forward and aft walls are substantially closer together than radially outer ends thereof; and (b) an annular stationary structure including substantially rigid annular forward and aft bearing surfaces which bear against the forward and aft walls, respectively, of the shroud segment, so as to restrain the shroud segments from axial movement and radially inward movement relative to the stationary structure.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
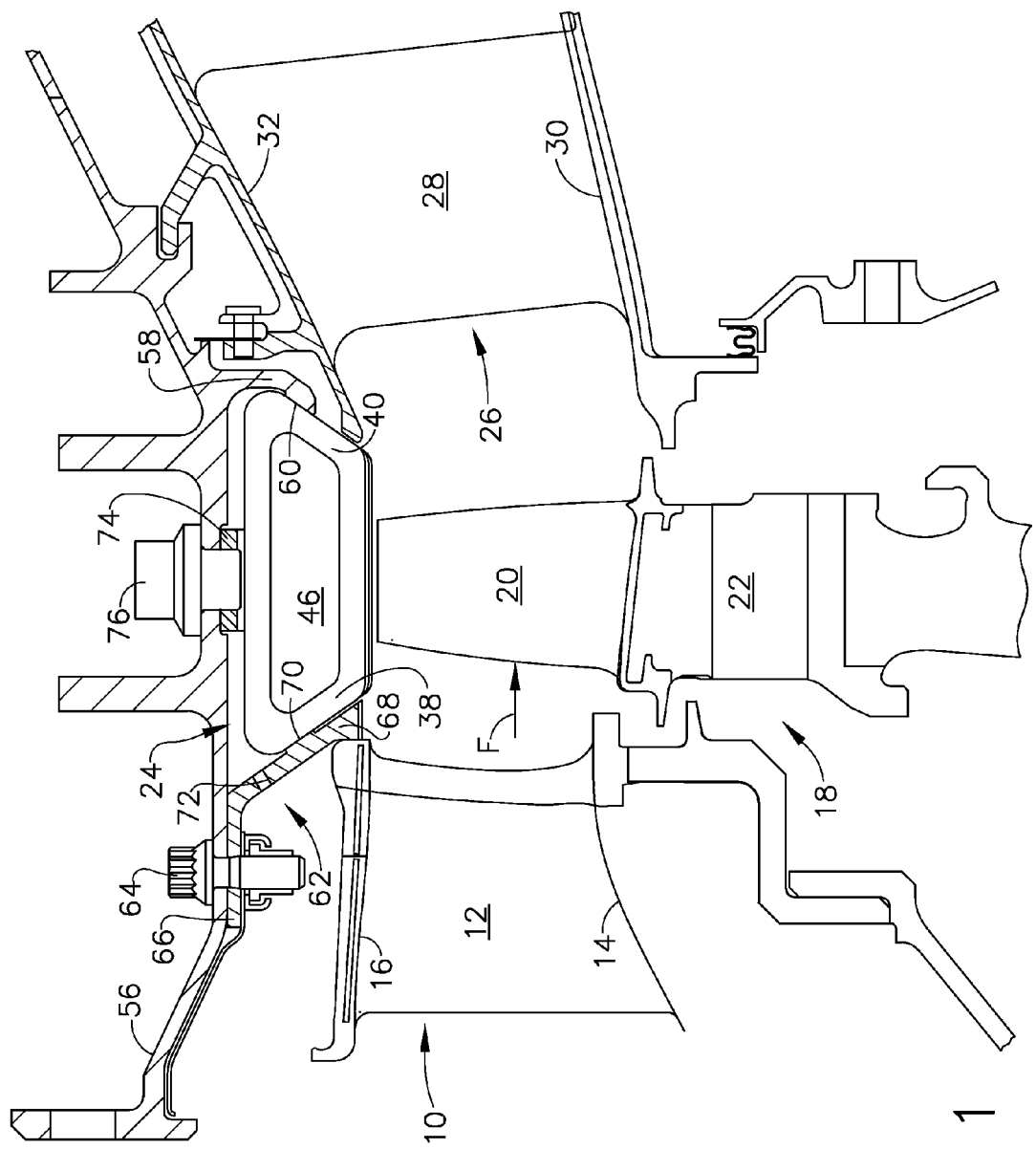
FIG. 1 is a schematic cross-sectional view of a portion of a turbine section of a gas turbine engine, incorporating a turbine shroud and mounting apparatus constructed in accordance with an aspect of the present invention.

Referring to the drawings wherein identical reference numerals denote the same elements throughout the various views, FIG. 1 depicts a small portion of a high pressure turbine ("HPT"), which is part of a gas turbine engine of a known type. The function of the HPT is to extract energy from high-temperature, pressurized combustion gases from an upstream combustor (not shown) and to convert the energy to mechanical work, in a known manner. The HPT drives an upstream compressor (not shown) through a shaft so as to supply pressurized air to the combustor.

In the illustrated example, the engine is a turbofan engine and a low pressure turbine would be located downstream of the high pressure turbine and coupled to a shaft driving a fan. However, the principles described herein are equally applicable to turbojet and turboshaft engines, as well as turbine engines used for other vehicles or in stationary applications.

The HPT includes an HPT nozzle 10 which comprises a plurality of circumferentially spaced airfoil-shaped hollow HPT vanes 12 that are supported between an arcuate, segmented HPT inner band 14 and an arcuate, segmented HPT outer band 16. The HPT vanes 12, HPT outer band 14 and HPT inner band 16 are arranged into a plurality of circumferentially adjoining nozzle segments that collectively form a complete 360° assembly. The HPT inner and outer bands 14 and 16 define the inner and outer radial flowpath boundaries, respectively, for the hot gas stream flowing through the HPT nozzle 10. The HPT vanes 12 are configured so as to optimally direct the combustion gases to an HPT rotor 18.

The HPT rotor 18 includes a array of airfoil-shaped HPT turbine blades 20 extending outwardly from a disk 22 that rotates about the centerline axis of the engine. An annular HPT shroud comprising a plurality of arcuate shroud segments 24 is arranged so as to closely surround the first stage turbine blades 20 and thereby define the outer radial flowpath boundary for the hot gas stream flowing through the HPT rotor 18.

A low pressure turbine ("LPT") nozzle 26 is positioned downstream of the HPT rotor 18, and comprises a plurality of circumferentially spaced airfoil-shaped hollow LPT vanes 28 that are supported between an arcuate, segmented inner band 30 and an arcuate, segmented outer band 32. The vanes 28, inner band 30 and outer band 32 are arranged into a plurality of circumferentially adjoining nozzle segments that collectively form a complete 360° assembly. The LPT vanes 28 are configured so as to optimally direct the combustion gases to a downstream LPT rotor (not shown).

Figure 2:
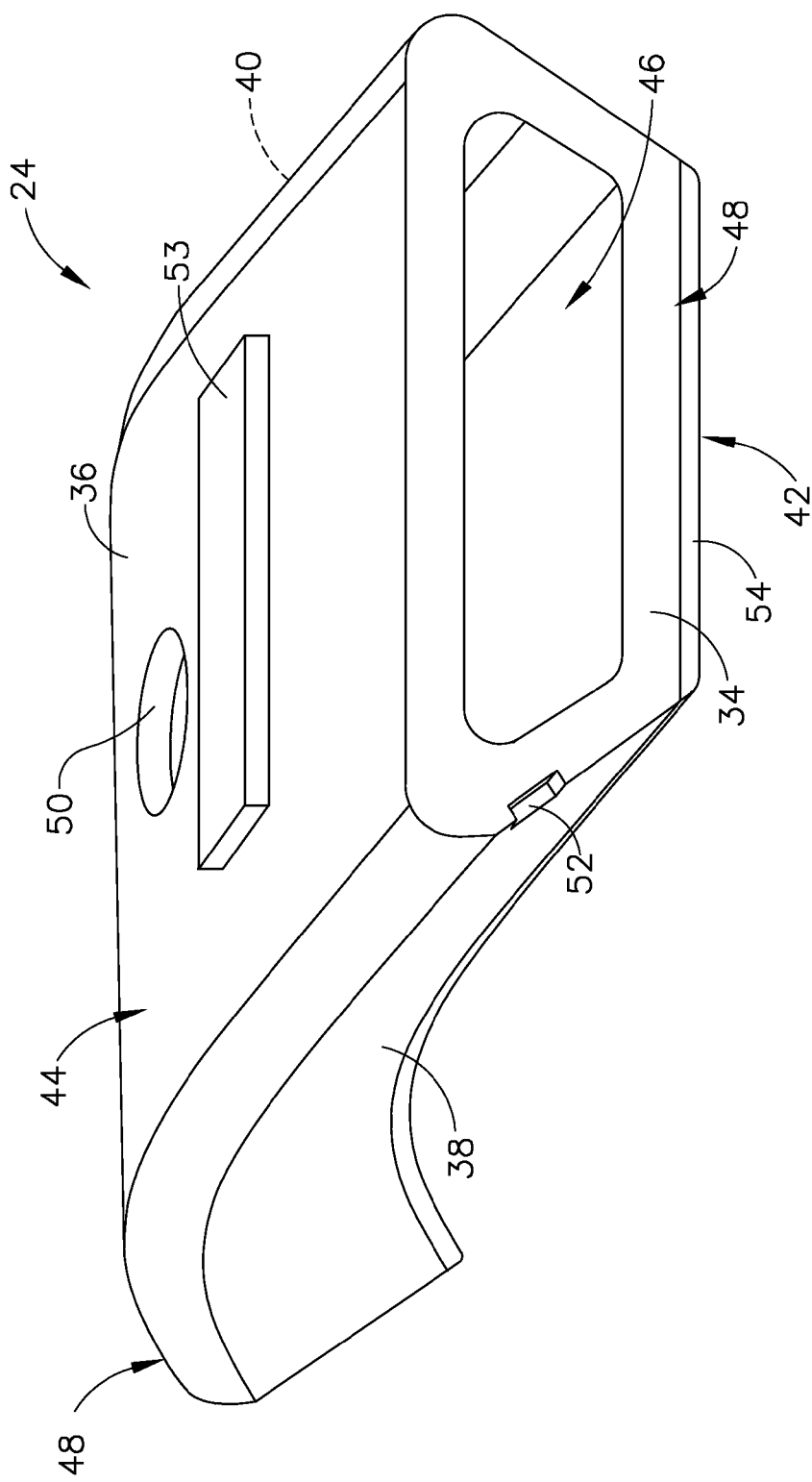
FIG. 2 is a perspective view of a turbine shroud segment shown in FIG. 1.

As seen in FIG. 2, each shroud segment 24 has a generally trapezoidal hollow cross-sectional shape defined by opposed inner and outer walls 34 and 36, and forward and aft walls 38 and 40. In the illustrated example, radiused transitions are provided between the walls, but sharp or square-edged transitions may be used as well. The forward and aft walls 38 and 40 are oriented at acute angles relative to the outer wall 36 and angle towards the chordwise center of the shroud segment 24 such that their inner ends are closer than their outer ends. As a result the outer wall 36 is substantially longer in the longitudinal direction than the inner wall 34. In the example illustrated, each of the forward and aft walls 38 and 40 extends substantially along a straight line between its radially inner and outer ends. The shroud segment 24 has a radially inner flowpath surface 42 and a radially outer back surface 44. A shroud cavity 46 is defined within the walls 34, 36, 38, and 40.

The shroud segments 24 include opposed end faces 48 (also commonly referred to as "slash" faces). As shown in FIG. 2, each of the end faces 48 lies in a plane parallel to the centerline axis of the engine, referred to as a "radial plane". They may also be oriented so to they are at an acute angle to such a radial plane. When assembled and mounted as described above, end gaps are present between the end faces 48 of adjacent shroud segments 24. One or more seals (not shown) may be provided at the end faces 48. Similar seals are generally known as "spline seals" and take the form of thin strips of metal or other suitable material which are inserted in slots in the end faces 48. The spline seals span the gaps between shroud segments 24.

The shroud segment 24 may include a locating feature which engages a mounting component in order to provide an anti-rotation function, as described in more detail below. Nonlimiting examples of locating features include a recess or hole 50 formed in or through the outer wall 36, one or more notches 52 formed in one or both of the end faces 48, or a rib 53 protruding from the outer wall 36.

The shroud segments 24 are constructed from a ceramic matrix composite (CMC) material of a known type. Generally, commercially available CMC materials include a ceramic type fiber for example SiC, forms of which are coated with a compliant material such as Boron Nitride (BN). The fibers are carried in a ceramic type matrix, one form of which is Silicon Carbide (SiC). Typically, CMC type materials have a room temperature tensile ductility of no greater than about 1%, herein used to define and mean a low tensile ductility material. Generally CMC type materials have a room temperature tensile ductility in the range of about 0.4 to about 0.7%. This is compared with metals having a room temperature tensile ductility of at least about 5%, for example in the range of about 5 to about 15%. The shroud segments 24 could also be constructed from other low-ductility, high-temperature-capable materials.

The flowpath surface 42 of the shroud segment 24 incorporates a layer of an abradable or rub-tolerant material 54 of a known type suitable for use with CMC materials. This layer is sometimes referred to as a "rub coat". In the illustrated example, the abradable material 54 is about 0.051 mm (0.020 in.) to about 0.76 mm (0.030 in.) thick.

Referring back to FIG. 1, the shroud segments 24 are mounted to a stationary engine structure. In this example the stationary structure is a turbine case 56. The turbine case 56 is annular and incorporates an annular flange 58 extending radially inward just aft of the shroud segment 24. The flange 58 includes an annular aft bearing surface 60 which is oriented generally parallel to and bears against the aft wall 40 of the shroud segment 24. A retainer 62 is removably mounted to the turbine case 56, for example using the illustrated bolt and nut combination 64 or other suitable fasteners. The retainer 62 is an annular component which may be segmented and has a generally L-shaped cross-section with axial and radial arms 66 and 68, respectively. The radial leg 68 includes an annular forward bearing surface 70 which is oriented generally parallel to and bears against the forward wall 38 of the shroud segment 24. In this example, the radial arm 68 extends at an angle parallel to the forward wall 38, but this configuration may be altered as necessary for a particular application. The material, sizing, and shapes of the flange 58 and the retainer 62 are selected so as to present substantially rigid stops against axial movement and radially inward movement of the shroud segment 24. It is also possible the retaining hardware could be reversed, with the retainer 62 being aft of the shroud segment 24, or with both retaining elements being removable, so long as the elements defining the forward and aft bearing surfaces 70 and 60 are substantially rigid. The radial leg 68 of the retainer 62 optionally includes one or more vent holes 72 passing therethrough.

Figure 4:
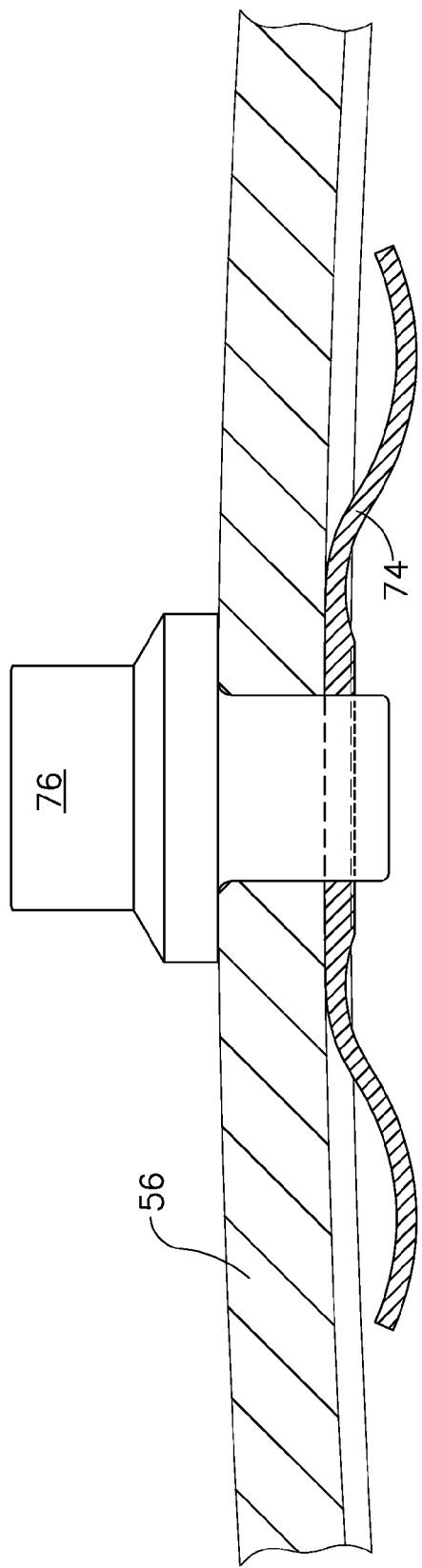
FIG. 4 is a cross-sectional view of a portion of the mounting apparatus of FIG. 1, showing a shroud loading spring.

Means are provided for holding the shroud segments 24 against the bearing surfaces 60 and 70. In this particular example a shroud load spring 74 is mounted between each of the shroud segments 24 and the turbine case 56. As shown in FIG. 4 the shroud load spring 74 is a convoluted leaf spring and is retained to the turbine case 56 by a locator pin 76 which passes through the turbine case 56.

Figure 3:
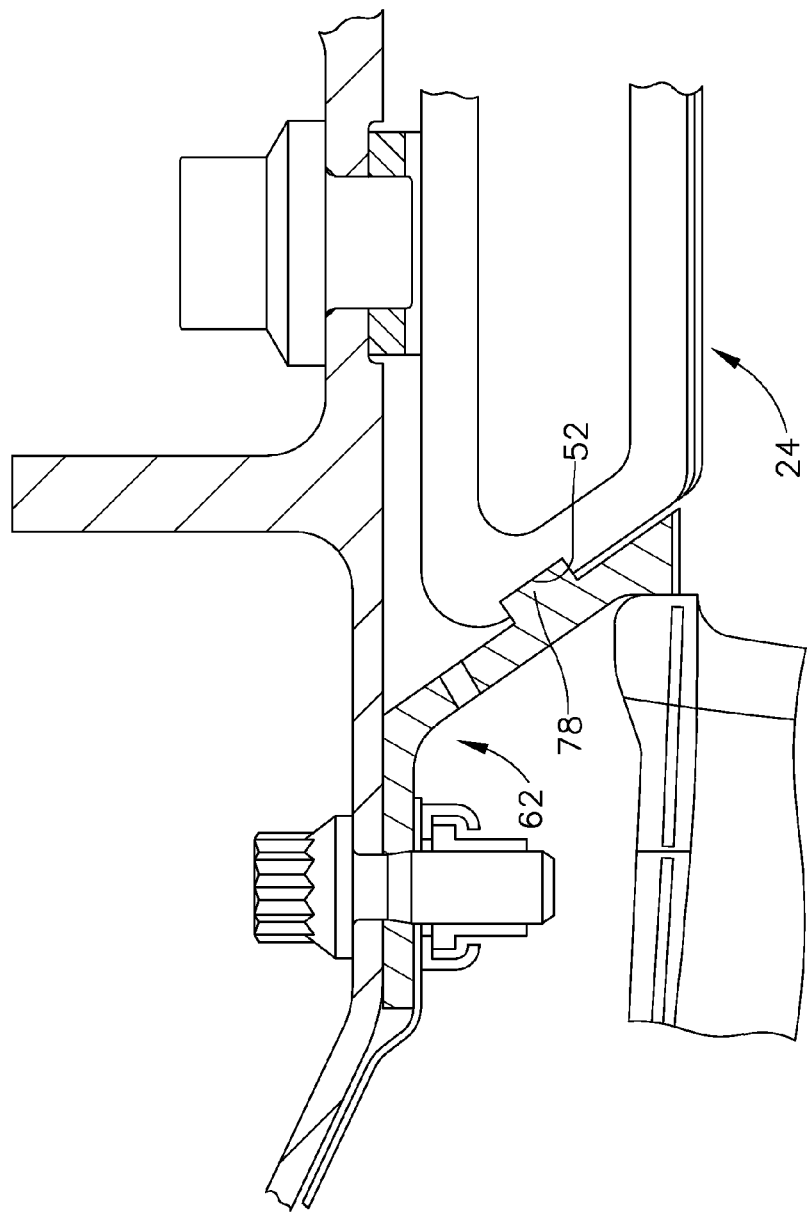
FIG. 3 is an enlarged cross-sectional view of a turbine shroud and mounting apparatus, showing an anti-rotation feature.

The structure mounting the shroud segments 24 to the turbine case 56 includes one or more elements which engage the locating features described above. For example, if the locator pins 76 are present, they may be elongated so as to extend radially inward and engage the holes or recesses 50 in the outer walls 36 of the shroud segments 24, or they may bear against the ribs 53 if present. Alternatively, as shown in FIG. 3, if the notches 52 are present, the flange 58 and/or the retainer 62 may be provided with tabs 78 that protrude from selected locations around their periphery. The tabs 78 are received in the notches 52.

Figure 5:
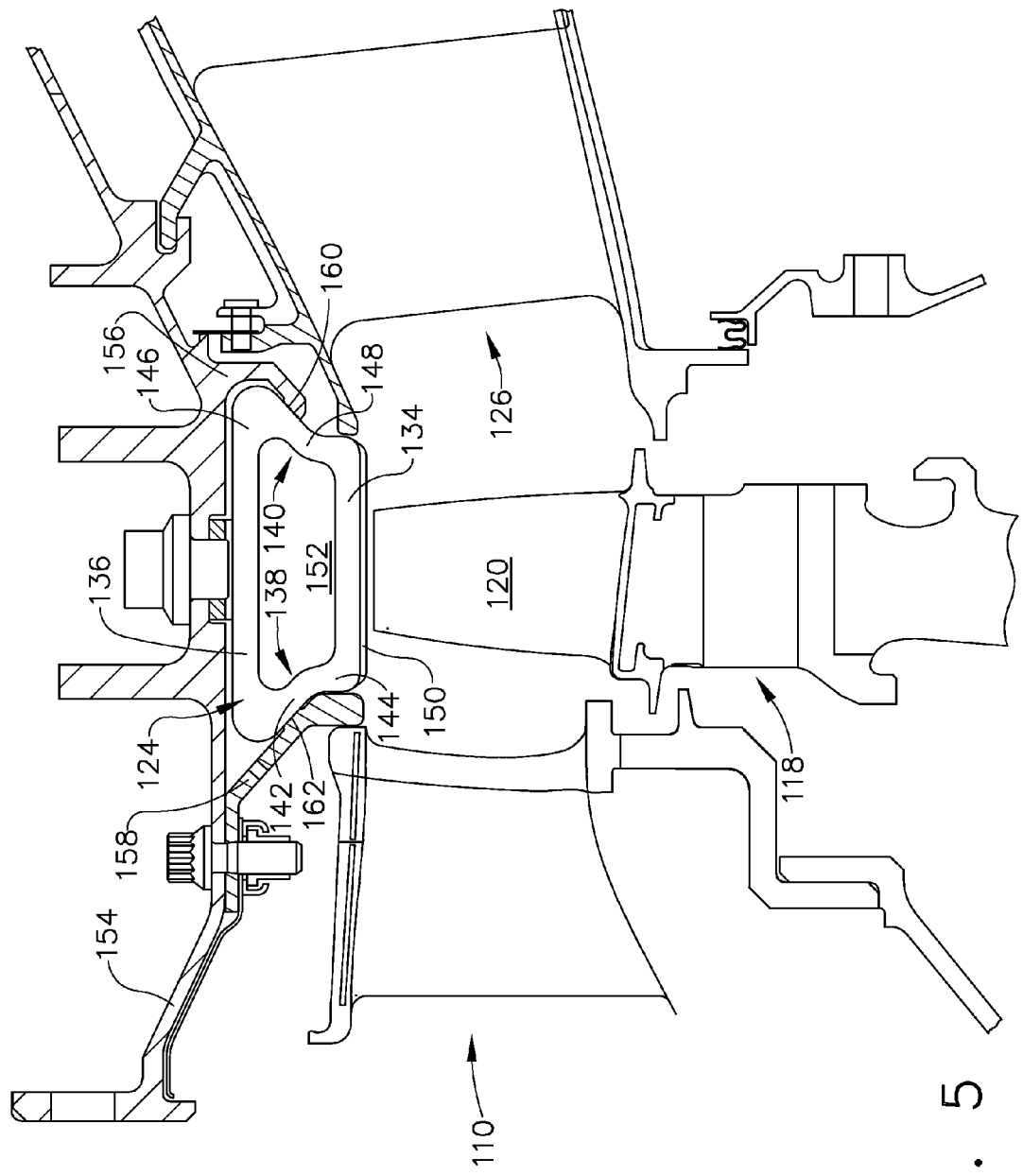
FIG. 5 is a schematic cross-sectional view of a portion of a turbine section of a gas turbine engine, incorporating a turbine shroud and mounting apparatus constructed in accordance with another aspect of the present invention.

FIG. 5 illustrates an HPT incorporating an alternative shroud structure. The HPT includes an HPT nozzle 110 and an HPT rotor 118, and an LPT nozzle 126 is positioned downstream. HPT blades 120 of the rotor 118 are surrounded by an annular HPT shroud comprising a plurality of arcuate shroud segments 124.

The shroud segments 124 are constructed from a ceramic matrix composite (CMC) material of a known type or another low-ductility, high-temperature-capable material. They are substantially similar to the shroud segments 24 described above except for their cross-sectional shape. Each shroud segment 124 has a hollow cross-sectional shape defined by opposed inner and outer walls 134 and 136, and forward and aft walls 138 and 140. In the illustrated example radiused transitions are provided between the walls, but sharp or square-edged transitions may be used as well. The outer wall 136 is substantially longer in the longitudinal direction than the inner wall 134. The forward wall 138 has an outer portion 142 which is angled to extend axially rearward and radially inward, and an inner portion 144 which extends in a primarily radial direction. The aft wall 140 has an outer portion 146 which is angled to extend axially forward and radially inward, and an inner portion 148 which extends in a primarily radial direction. The shroud segment 124 has a radially inner flowpath surface and a radially outer back surface. The flowpath surface incorporates a rub coat or rub-tolerant coating 150 as described above. A shroud cavity 152 is defined within the walls 134, 136, 138, and 148, and the shroud segments 124 include opposed end faces as described above. The shroud segments 124 may include locating features as described above.

The shroud segments 124 are mounted to a stationary structure, e.g. a turbine case 154 which includes an annular flange 156 extending radially inward just aft of the shroud segment 124. A retainer 158 is removably attached to the turbine case 154 just forward of the shroud segment 124. The flange 156 and the retainer 158 include annular bearing surfaces 160 and 162 which bear against the against the aft and forward walls 140 and 138, respectively, of the shroud segment 124. In particular they bear against the outer portions 142 and 146. The shroud segments 124 are thus physically mounted and located as described above. However, the size and location of the flowpath surface may be varied as desired to suit a particular application. This may allow more compact "packaging" of the shroud segments 124 relative to the surrounding hardware.

In operation, the shroud segments 24 are exposed to secondary air flow (typically compressor discharge pressure or "CDP") routed through the vent holes 72 in the retainers 62 or other suitable passages. CDP air is at substantially higher static pressure than flowpath air "F", and accordingly there will be a pressure gradient tending to force the shroud segments 24 radially inward against the forward and aft bearing surfaces 70 and 60. The configuration of the bearing surfaces 70 and 60 prevents radially inboard and forward or aft axial motion of the shroud segments 24. The pressure gradient also causes an inward "wedging" action which tends to seal the shroud segment 24 against the bearing surfaces 70 and 60 and therefore mitigate leakage of CDP air into the flowpath F. Simultaneously, the locating features such as the pins 76 or tabs 78 restrain the shroud segments 24 against rotation This configuration also minimizes thermal growth difference problems by allowing the shroud segments 24 to expand or contract relative to the support structure without increasing the stress in the components. This is accomplished by allowing the shroud to slide along the bearing surfaces 70 and 60.

When the engine is not running, gravity forces would tend to make the shroud segments 24 located on the bottom half of the engine (opposite of the segments shown in FIG. 1) fall away from the bearing surfaces 70 and 60. To prevent this from occurring, the shroud load springs 74 urge the shroud segments 24 radially inward to maintain contact at all times.

The shroud segment configuration described herein has several advantageous characteristics. It is not dependent on inconsistent frictional clamping forces for mounting, requires a minimal number of holes or other features through the CMC material which would serve as stress risers, and will minimize mounting issues due to thermal expansion differences between the shroud material and the surrounding metallic hardware. This arrangement can have the added benefit of highly effective sealing between the mounting structure and the shroud sidewalls, which can improve the overall efficiency of the engine.

The foregoing has described a turbine shroud structure and mounting apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine shroud apparatus for a gas turbine engine, comprising:
   (a) a plurality of arcuate shroud segments arranged to form an annular shroud, each of the shroud segments comprising low-ductility material and having a cross-sectional shape defined by opposed forward and aft walls, and opposed inner and outer walls, the walls extending between opposed first and second end faces, wherein at least a portion of each of the forward and aft walls is oriented at an acute angle to the outer wall, and wherein radially inner ends of the forward and aft walls are substantially closer together than radially outer ends thereof; and
   (b) an annular stationary structure including substantially rigid annular forward and aft bearing surfaces which bear directly against the forward and aft walls, respectively, of the shroud segment, so as to restrain the shroud segments from axial movement and radially inward movement relative to the stationary structure, wherein one of the bearing surfaces includes at least one tab extending therefrom, each of the at least one tabs received in a notch formed in one of the shroud segments so as to prevent relative rotation of the shroud segment and the stationary structure.

2. The apparatus of claim 1 wherein each of the forward and aft walls extends along a straight line between its radially inner and outer ends.

3. The apparatus of claim 1 wherein:
   (a) each of the forward and aft walls includes:
      (i) an outer portion extending inward from the outer wall, wherein radially inner ends of the radially outer portions are closer together than radially outer ends thereof; and
      (ii) an inner portion which extends between the outer portion and the inner wall in a substantially radial direction; and
   (b) the forward and aft bearing surfaces bear against the outer portions of the forward and aft walls, respectively.

4. The apparatus of claim 1 wherein the shroud segments comprise a ceramic matrix composite material.

5. The apparatus of claim 1 wherein the stationary structure includes:
   (a) an annular turbine case surrounding the shroud segments;
   (b) a flange extending radially inward from the turbine case and defining the aft bearing surface; and
   (c) a removably mounted retainer extending radially inward from the turbine case and defining the forward bearing surface.

6. The apparatus of claim 1 wherein the stationary structure carries a locating pin which extends radially inward and engages a recess or hole formed in the outer wall of one of the shroud segments to as to prevent relative rotation of the shroud segment and the stationary structure.

7. The apparatus of claim 1 further including at least one shroud loading spring disposed between the stationary structure and the shroud segments which urges the shroud segments towards the bearing surfaces.

8. The apparatus of claim 7 wherein a leaf-type shroud loading spring is disposed between each of the shroud segments and the stationary structure.

9. The apparatus of claim 7 wherein each shroud loading spring is retained by a locating pin carried by the stationary structure.

10. The apparatus of claim 1 wherein the outer wall of at least one of the shroud segments includes at least one rib extending therefrom which bears against a locating pin carried by the stationary structure so as to prevent relative rotation of the shroud segment and the stationary structure.

* * * * *